(12) United States Patent
Lee et al.

(10) Patent No.: US 8,562,153 B2
(45) Date of Patent: Oct. 22, 2013

(54) LASER SCANNING DISPLAY AND BEAM ALIGNMENT METHOD THEREOF

(75) Inventors: Sang Keun Lee, Seoul (KR); Dong Uk Lee, Seoul (KR); Jae Wook Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 372 days.

(21) Appl. No.: 13/000,311

(22) PCT Filed: Jul. 1, 2009

(86) PCT No.: PCT/KR2009/003585
§ 371 (c)(1),
(2), (4) Date: Dec. 29, 2010

(87) PCT Pub. No.: WO2010/002189
PCT Pub. Date: Jan. 7, 2010

(65) Prior Publication Data
US 2011/0102747 A1 May 5, 2011

(30) Foreign Application Priority Data
Jul. 1, 2008 (KR) .................. 10-2008-0063514

(51) Int. Cl.
*G03B 21/14* (2006.01)
*G03B 21/00* (2006.01)
(52) U.S. Cl.
USPC ............................................. 353/119; 353/31

(58) Field of Classification Search
USPC .................................................... 353/31, 119
See application file for complete search history.

(56) References Cited

U.S. PATENT DOCUMENTS

| 5,689,378 | A | * | 11/1997 | Takashima et al. | 359/813 |
|---|---|---|---|---|---|
| 5,997,153 | A | * | 12/1999 | Naoe et al. | 362/259 |
| 6,764,183 | B2 | * | 7/2004 | Okazaki | 353/31 |
| 6,928,100 | B2 | * | 8/2005 | Sato et al. | 372/109 |
| 7,226,218 | B2 | * | 6/2007 | Wang et al. | 385/91 |
| 7,301,265 | B2 | * | 11/2007 | Fujisawa | 313/113 |
| 2005/0168826 | A1 | * | 8/2005 | Koulikov et al. | 359/641 |
| 2006/0092997 | A1 | | 5/2006 | Lee | |

FOREIGN PATENT DOCUMENTS

| KR | 10-2006-0029882 A | 4/2006 |
|---|---|---|
| KR | 10-2006-0039495 A | 5/2006 |
| KR | 10-2006-0085418 A | 7/2006 |

* cited by examiner

*Primary Examiner* — Thanh Luu
(74) *Attorney, Agent, or Firm* — Birch, Stewart, Kolasch & Birch, LLP

(57) ABSTRACT

A laser scanning display including a micro scanning mirror, and a beam alignment method thereof are disclosed. A scanning display includes a frame, at least one light source fixedly secured to the frame, a lens positioned in front of a light emission surface of the light source, the lens having a holder detachably mounted to an external adjusting device which is to make fine adjustment to finish beam alignment, and a fastening portion for fastening the lens having beam alignment finished thus to the frame.

17 Claims, 18 Drawing Sheets

LASER SCANNING DISPLAY AND BEAM ALIGNMENT METHOD THEREOF

TECHNICAL FIELD

The present invention relates to displays, and more particularly, to a laser scanning display including a micro scanning mirror, and a beam alignment method thereof.

BACKGROUND ART

The laser scanning display is a device in which a screen is scanned with a light from a light source in horizontal and vertical directions, or vertical and horizontal directions by using a mirror for displaying an image.

Recently, an MEMS mirror is used, to make a system smaller, to have a high resolution and good reliability, and to save a material cost.

A micro scanning mirror under development is operative tuned to a resonance frequency based on a spring-damper characteristic of a hinge at the time of horizontal direction scanning.

By driving the micro scanning mirror at the resonance frequency, many scanning angles can be produced by low energy. In this instance, the resonance frequency is designed to synchronize to a horizontal synchronizing frequency of the screen being scanned. Moreover, by operating the micro scanning mirror in a vertical direction too, the screen can be scanned.

DISCLOSURE OF INVENTION

Technical Problem

An object of the present invention is to provide a laser scanning display including a micro scanning mirror, and a beam alignment method thereof, which enables simple beam alignment only with adjustment of a lens.

Technical Solution

To achieve these objects and other advantages and in accordance with the purpose of the invention, as embodied and broadly described herein, a beam alignment method of a scanning display having a light source and a lens includes the steps of providing a frame having the light source fixedly secured thereto, moving the lens to a front side of a light emission surface of the light source, making fine adjustment of the lens in air to determine whether the beam alignment is finished or not, and fastening the lens to the frame when the beam alignment is finished.

In another aspect of the present invention, a scanning display includes a frame, at least one light source fixedly secured to the frame, a lens positioned in front of a light emission surface of the light source, the lens having a holder detachably mounted to an external adjusting device which is to make fine adjustment to finish beam alignment, and a fastening portion for fastening the lens having beam alignment finished thus to the frame.

In this instance, the frame can include a first hole formed in a first surface of the frame for mounting the light source thereto, and a second hole formed in a second surface of the frame for mounting the lens thereto.

And, the holder of the lens can be a projection from a portion of an edge region of the lens.

And, the fastening portion can be either an adhesive or a fastening screw, and the fastening portion can fasten one region or two regions of the edge of the lens to the frame.

In another aspect of the present invention, a scanning display includes a frame having a light source, a color mixing unit and a scanner fixedly secured thereto, a lens positioned in front of a light emission surface of the light source for changing the light from the light source parallel, a holder projected from one side of the lens to be subjected to fine adjustment by an external force for beam alignment of the lens, and an adhesive formed symmetry with each other at opposite sides of the lens opposite to the frame for bonding the frame to the lens.

ADVANTAGEOUS EFFECTS

The laser scanning display including a micro scanning mirror, and the beam alignment method thereof of the present invention has following advantageous effects.

Since the beam alignment of the lens and the light source can be made by making beam alignment of the lenses to the light sources of the laser scanning display of the present invention which are fixedly secured to the frame, resulting to have 18 degrees of freedom in total, time and equipment can be reduced, significantly.

That is, since both collimation in which a parallel light of lens is formed and alignment can be carried out at a time, not to require alignment of the light source and the lens assembly again, the degrees of freedom of adjustment can be minimized.

Thus, the maximizing of the advantages of reduced time and equipment of the beam alignment owing to minimization of the degrees of freedom of adjustment and the minimization of components of the laser scanning display and the degrees of freedom of adjustment permits to improve assembly work and mass productivity.

BEST MODE

Embodiments of the present invention will be described in detail with reference to the attached drawings.

Figure 1:
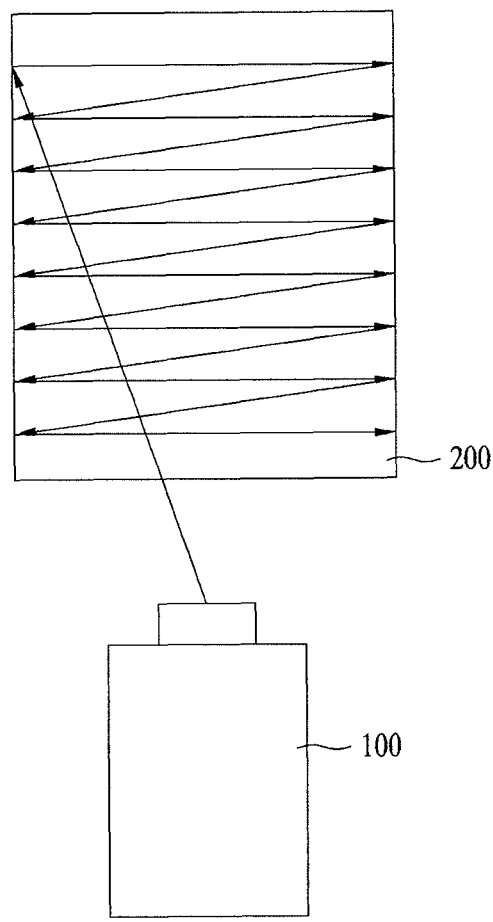
FIG. 1 illustrates a schematic view of a laser scanning display in accordance with a preferred embodiment of the present invention.

Referring to FIG. 1, the laser scanning display 100 uses an MEMS mirror scanner to scan a screen 200 with a laser beam for producing an image.

In this instance, the laser scanning display 100 uses a scanning mode in which the scanner scans from a first line to a last line with the laser beam for displaying one picture, and returns to the first line for displaying a next picture.

Figure 2:
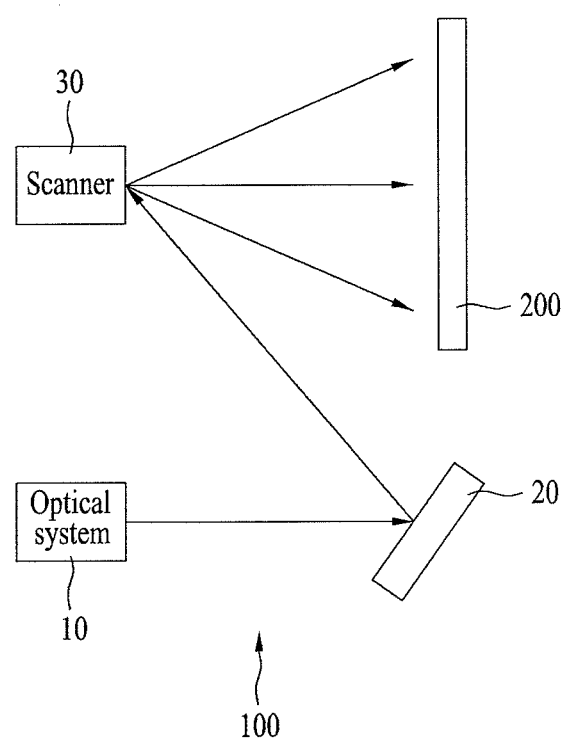
FIG. 2 illustrates a detailed schematic view of the laser scanning display in FIG. 1.

Referring to FIG. 2, the laser scanning display 100 which performs such a mode can include an optical system 10 for producing and forwarding an image by using a laser beam, a mirror 20 for reflecting the image from the optical system 10 to a scanner 30, and the scanner 30 for scanning a screen 200 with the image reflected at the mirror 20 in horizontal and vertical directions.

Figure 3:
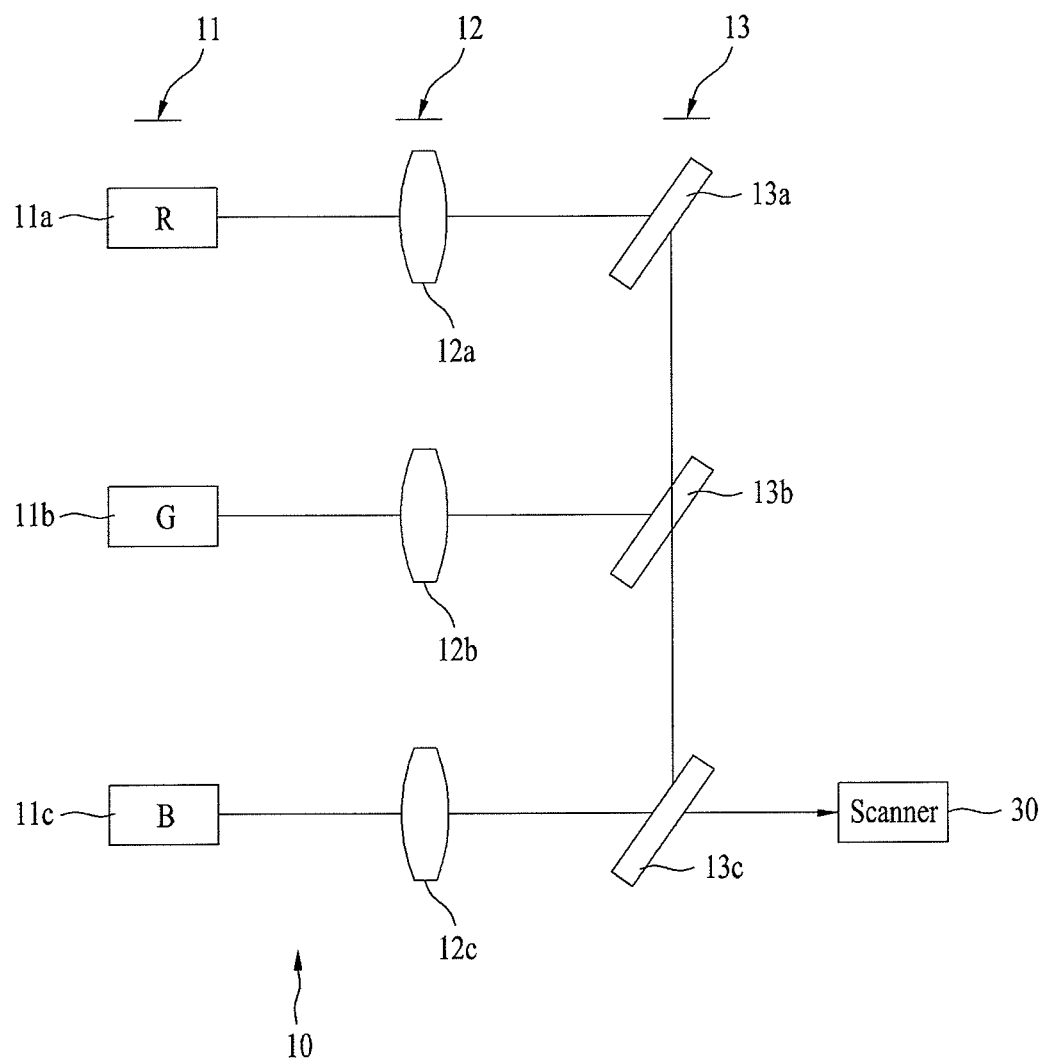
FIG. 3 illustrates a schematic view of the optical system in FIG. 2.

In this instance, referring to FIG. 3, the optical system 10 includes a light source 11, a collimator unit 12 and a color mixing unit 13.

In this instance, the light source 11 can have red, green and blue light sources 11a, 11b and 11c, of laser diodes LD, or LEDs.

The collimator unit 12 can have a collimating lens for changing the light from the light source 11 to a parallel light.

In this instance, the collimating lens 12 can have first to third collimating lenses 12a, 12b and 12c in correspondence to the red, green and blue light sources 11a, 11b and 11c, respectively.

The red, green and blue lights changed to the parallel lights thus are mixed into a color by the color mixing unit 13 for producing the picture.

In the meantime, in such a course of travel of the lights, a beam alignment process is required for the light source 11, the collimator unit 12, and the color mixing unit 13.

Figure 4:
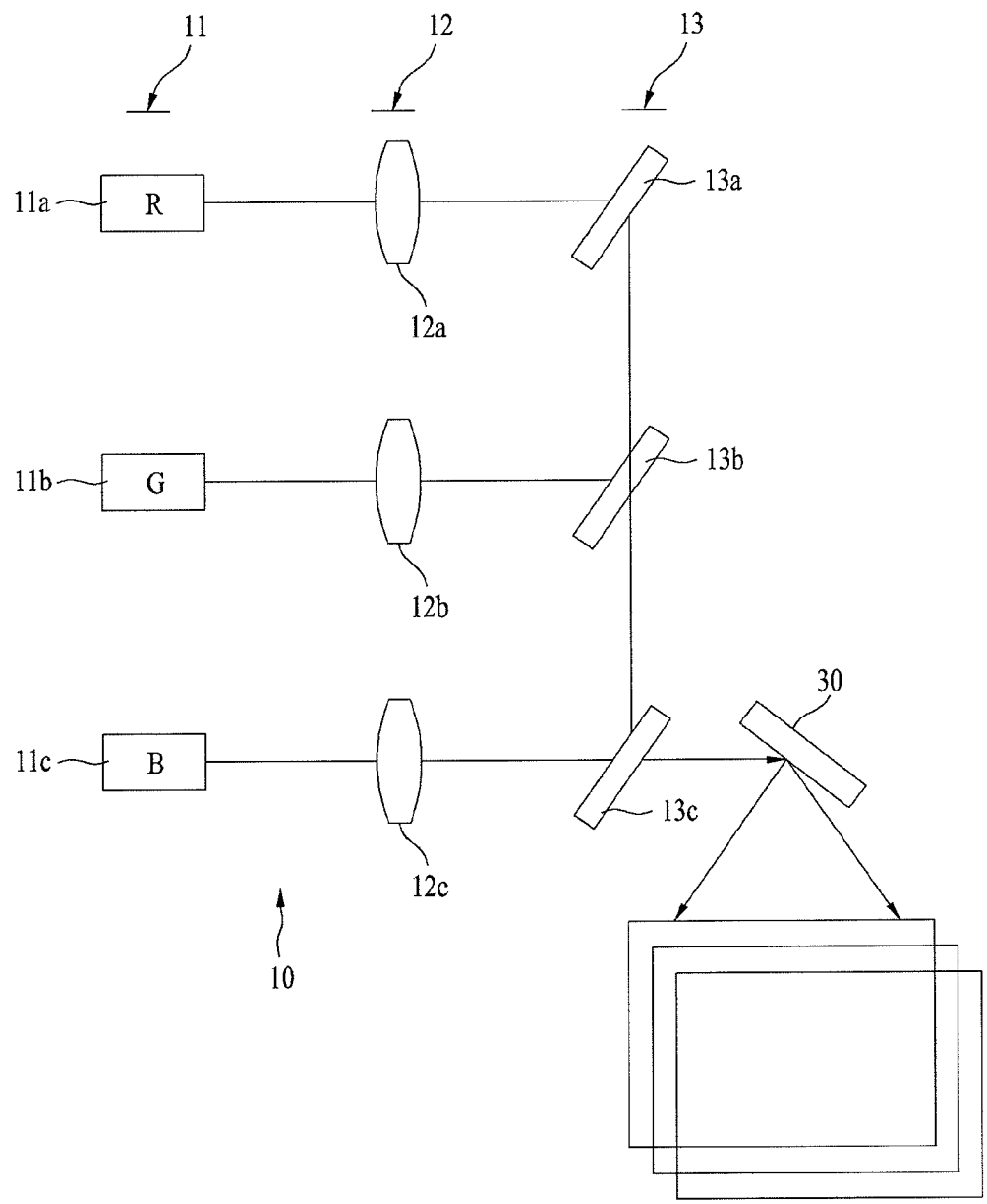
FIG. 4 illustrates a schematic view the optical system in FIG. 2 producing a picture.

This is because a process tolerance takes place due to the red, green and blue light sources 11a, 11b and 11c, resulting to produce images from the red, green and blue light sources 11a, 11b and 11c on the screen misaligned as shown in FIG. 4.

Consequently, it is required that the light source 11, the collimator unit 12, and the color mixing unit 13 in the optical system are arranged to be in beam alignment.

Figure 5:
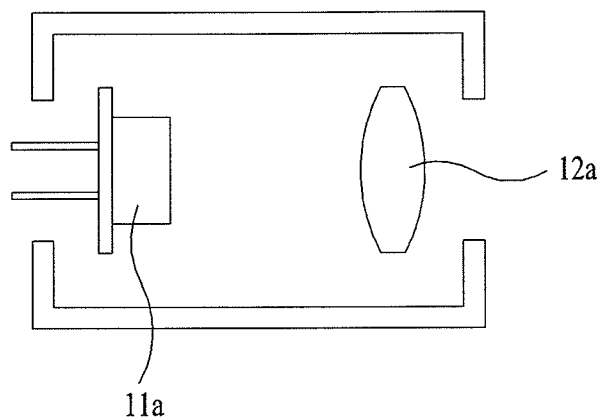
FIG. 5 illustrates a schematic view of an assembly of a light source and a lens.

As an example, referring to FIG. 5, at first, the red light source 11a and the first collimating lens 12a are adjusted to be in beam alignment for a first time and secured to an assembly 40, and the assembly 40 having the red light source 11a and the first collimating lens 12a included thereto is adjusted to be in bean alignment again for a second time and secured to a frame.

That is, the beam alignment can be made, first by fixing one of the red light source 11a and the first collimating lens 12a, second by adjusting the other one which is not fixed to be in beam alignment for the first time, and third by adjusting the assembly 40 having the red light source 11a and the first collimating lens 12a included thereto to be in beam alignment for the second time.

In this instance, if the red light source 11a is fixed to the assembly 40 at first, the first collimating lens 12a can move a position thereof with three degrees of freedom for beam alignment, and, in addition to this, since the first collimating lens 12a has three more degrees of freedom for angular adjustment, the first collimating lens 12a has six degrees of freedom in total (If the first collimating lens 12a is symmetry with respect to an axis of the light, there will be five degrees of freedom in total).

And, the assembly 40 has six degrees of freedom in total in a process the assembly 40 itself aligns with respect to the light axis.

Therefore, the assembly 40 having the red light source 11a and the first collimating lens 12a included thereto becomes to have total 12 degrees of freedom, and since the assembly 40 requires three colors of red, green and blue colors, the assembly 40 becomes to have 36 degrees of freedom, at the end.

However, a process for making beam alignment of the assembly 40 having the 36 degrees of freedom can take a long time and much equipment.

Accordingly, embodiments of the present invention for reducing the degrees of freedom further will be described.

Figure 6:
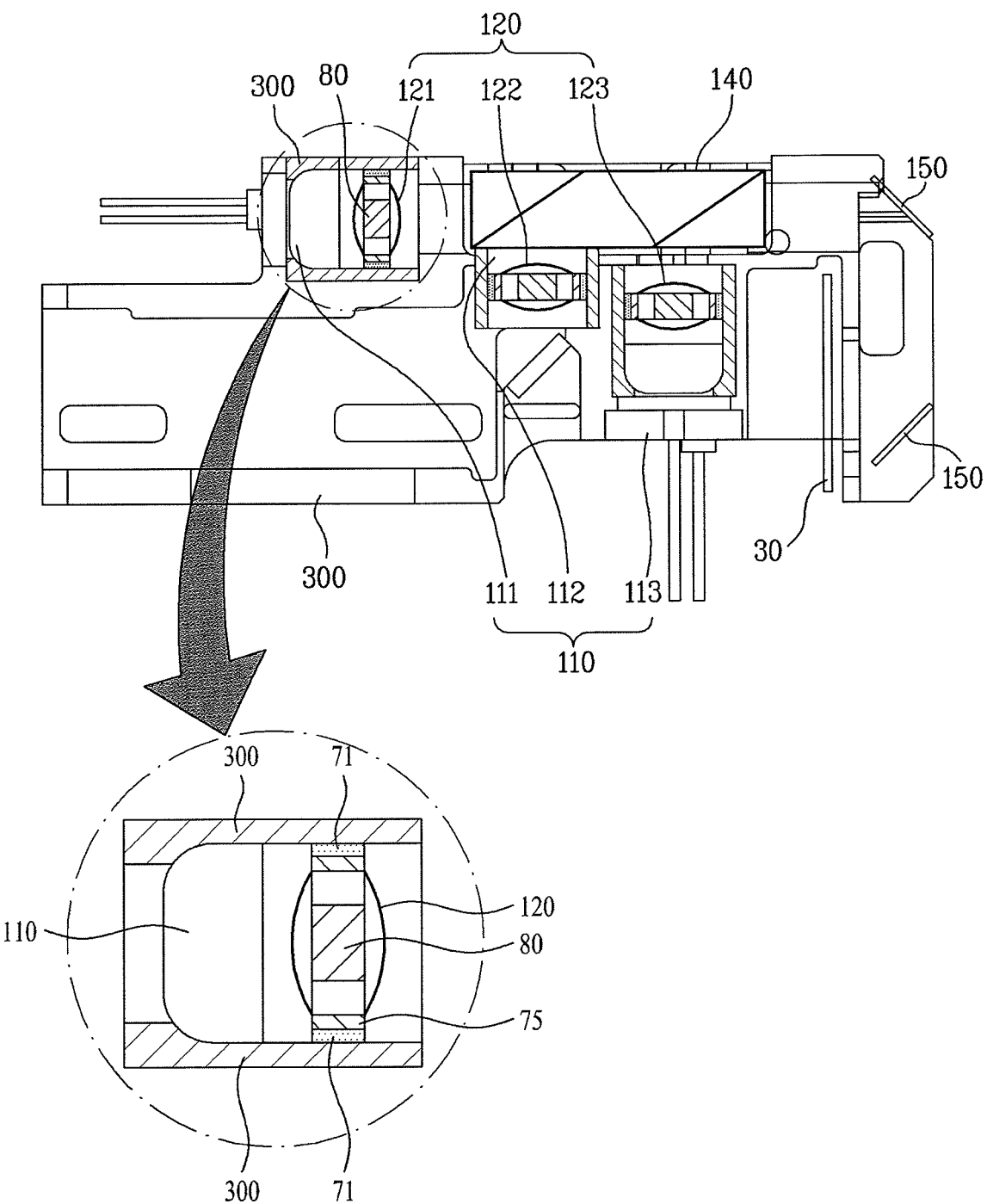
FIG. 6 illustrates a plan view of a laser scanning display in accordance with a preferred embodiment of the present invention.

Referring to FIG. 6, the present invention can include a frame 300, a light source 110, a lens 120, a color mixing unit 140, a mirror 150, and a scanner 30.

Figure 7:
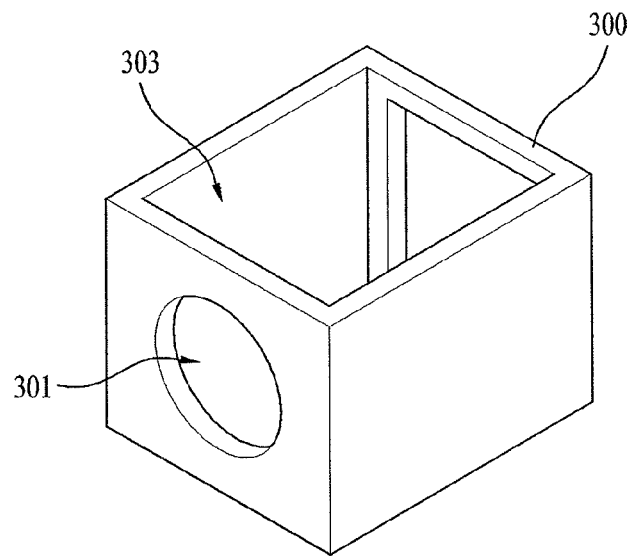
FIG. 7 illustrates a perspective view of a frame having holes formed therein.

In this instance, referring to FIG. 7, the frame 300 can include a first hole 301 formed in a first surface of the frame 300 for mounting the light source 110 therein, and a second hole 303 formed in a second surface of the frame 300 for mounting the lens 120 therein.

In this instance, the first surface of the frame 300 is perpendicular to the second surface of the frame 300.

And, the frame 300 can have a plurality of recesses for mounting the color mixing unit 140, the mirror 150, the scanner 30, and so on thereto, respectively.

Then, the light source 110, having red, green and blue light sources 111, 112 and 113, is fixedly secured to the first hole 301 in the frame 300, respectively.

Then, the lens 120, positioned in front of a light emission surface of the light source 110, has a holder 80 for performing collimation and alignment at a time.

Figure 8:
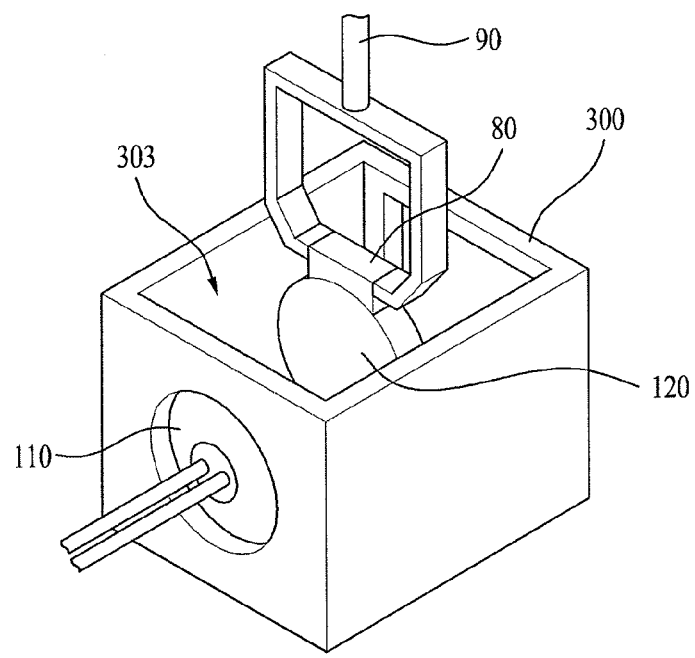
FIG. 8 illustrates a perspective view showing a lens in a hole of a frame adjusted finely by an adjusting device.

In this instance, referring to FIG. 8, the holder 80 can be detachably mounted to an external adjustment unit such that the holder 80 can be subjected to fine adjustment to finish the beam alignment by the external adjustment unit 90.

Therefore, it is preferable that the holder 80 is a projection from a portion of an edge region of the lens 120.

And, the lens 120 can have at least one contact projection 75 in contact with a fastening portion 71.

Figure 9:
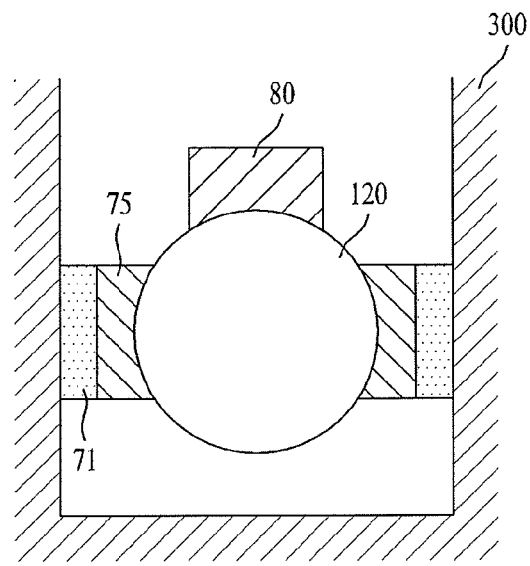
FIGS. 9 and 10 illustrate schematic views of lenses fastened with adhesives, respectively.
Figure 10:
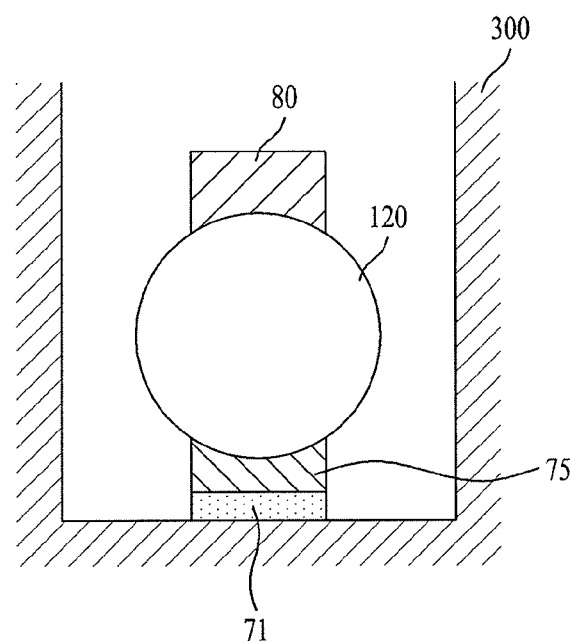
Figure 11:
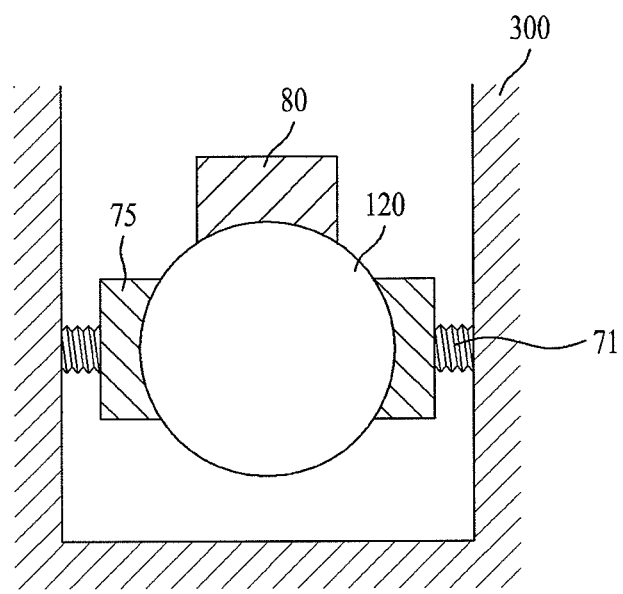
FIG. 11 illustrates a schematic view of a lens fastened with a fastening screw.

In this instance, referring to FIGS. 9 to 11, the contact projection 75 serves assisting the lens 120 being fastened to the frame 300 by the fastening portion 71, firmly.

Accordingly, it is preferable that the contact projection 75 is projected from a portion of the edge region of the lens 120 opposite to the frame 300.

And, referring to FIG. 10, the contact projection 75 can be one as shown in FIG. 10 or two as shown in FIG. 9.

Depending on cases, the lens 120 can be formed as one unit with the holder 80.

Then, the fastening portion 71 serves to fasten the lens 120 having beam alignment thereof finished to the frame 300.

In this instance, the fastening portion 71 can be an adhesive like an UV hardener as shown in FIGS. 9 and 10, a fastening screw as shown in FIG. 11, or both.

That is, the fastening portion 71 can fasten one region of the edge the lens 120 to the frame 300 as shown in FIG. 10, or two regions of the edge of the lens 120 to the frame 300 as shown in FIG. 9.

In this instance, in a case two regions of the edge of the lens 120 are fastened to the frame 300 as shown in FIG. 9, it is preferable that the two regions of the edge of the lens 120 fastened to the frame 300 are symmetry to each other.

Next, the color mixing unit 140 is fixedly secured to the frame 300 for mixing the light from the light source 110, and the scanner 30 is fixedly secured to the frame 300 for scanning the screen with the light mixed by the color mixing unit 140.

A beam alignment method of the laser beam display of the present invention will be described.

Figure 12:
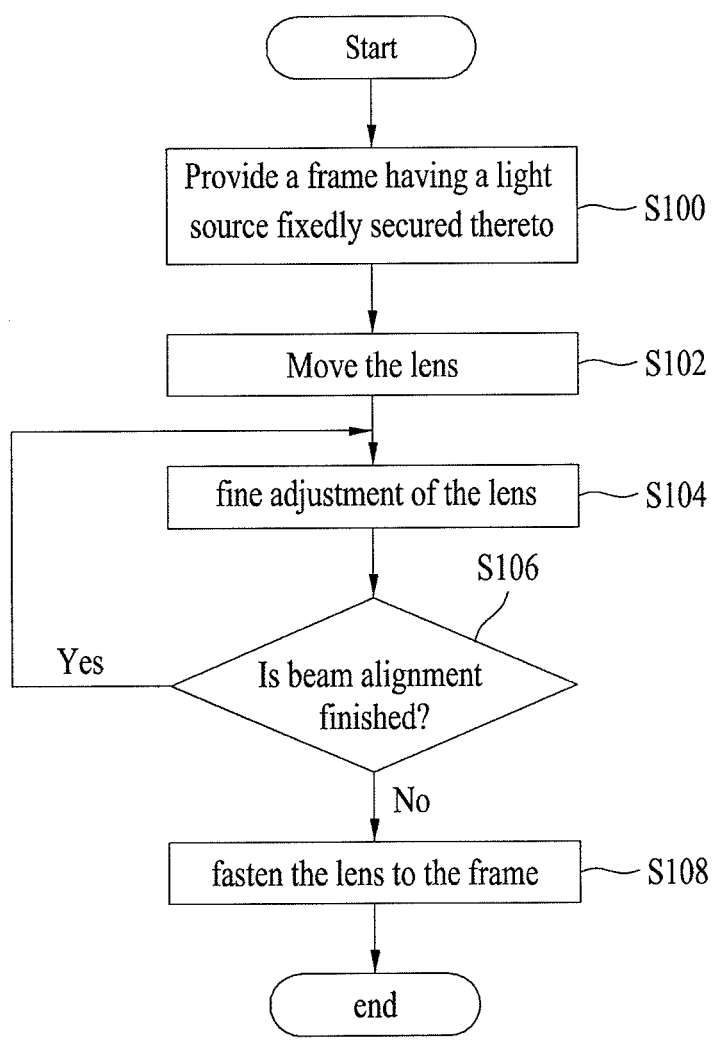
FIG. 12 illustrates a flow chart showing the steps of a beam alignment method of a laser scanning display in accordance with a preferred embodiment of the present invention.

FIG. 12 illustrates a flow chart showing the steps of a bean alignment method of a laser scanning display in accordance with a preferred embodiment of the present invention.

At first, a frame having a plurality of holes as shown in FIG. 7 is provided, and a light source is fixedly secured to the hole as shown in FIG. 8 (S100).

Then, referring to FIG. 8, after picking up a region of an edge of a lens with a chuck of a jig, the lens held by the chuck is moved to a front side of a light emission surface of a light source (S102).

And, the lens positioned in front of the light emission surface of a light source is subjected to fine adjustment in air by using the chuck of the jig, again (S104).

Then, beam alignment of the lens subjected to fine adjustment thus is measured with an external alignment measuring unit and beam alignment measured thus is verified by an external control unit (S106).

Then, if the external control unit determines that the beam alignment measured thus is appropriate, the external control unit controls the chuck of the jig to finish the fine adjustment of the lens.

And, referring to FIGS. 9 and 10, upon finishing the beam alignment of the lens, after placing an adhesive inbetween a region of an edge of the lens having the beam alignment finished thus and a frame, the adhesive is set, to fasten the lens to the frame (S108).

In this instance, bonding can be one point bonding in which one region of the edge of the lens is bonded, or two point bonding in which two regions of the edge of the lens are bonded.

Referring to FIG. 11, if it is intended to fasten the lens to the frame with a fastening screw, at first, the fastening screw at the frame can be moved to bring the fastening screw into contact with one region of the edge of the lens having the beam alignment finished thus for a first time, and the fastening screw at the frame can be moved for a second time, to fasten the lens.

Figure 13:
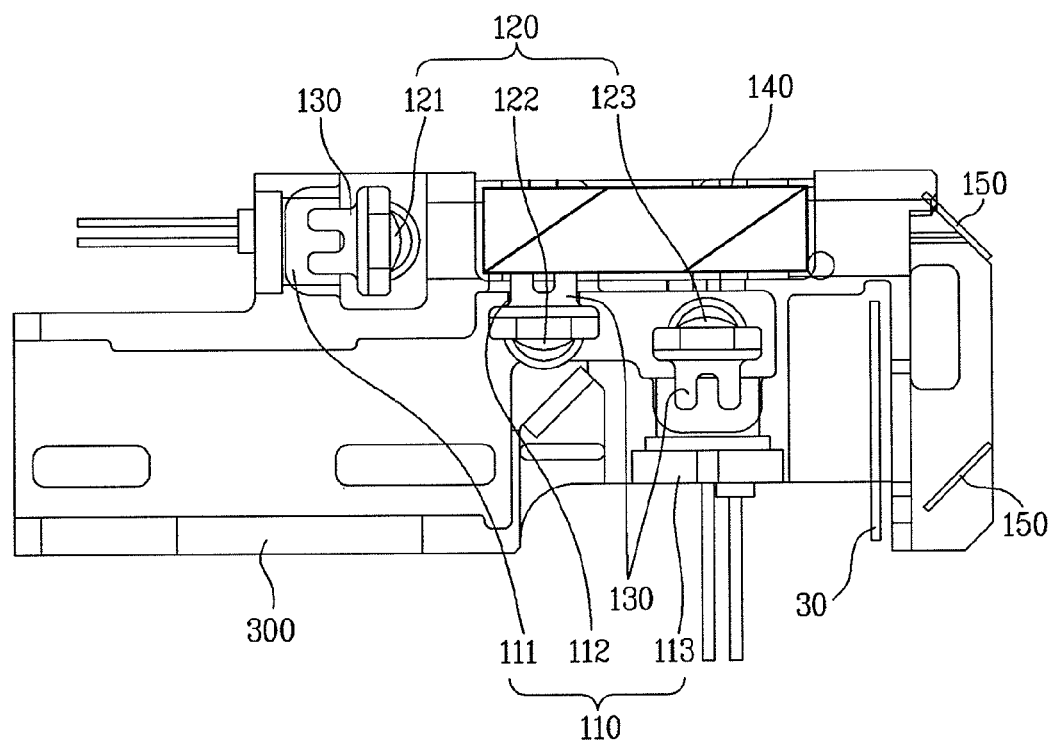
FIG. 13 illustrates a plan view of a laser scanning display in accordance with another preferred embodiment of the present invention.

FIG. 13 illustrates a plan view of a laser scanning display in accordance with another preferred embodiment of the present invention. Referring to FIG. 13, the laser scanning display can include a lens unit having a lens holder 130 and a lens 120, a frame 300, a light source 110, a color mixing unit 140, a mirror 150, and a scanner 30.

In this instance, the frame 300 has a first hole and a second hole, wherein the first hole can be formed in a first surface of the frame 300 for mounting the light source 110 therein, and the second hole is formed in a second surface of the frame 300 for mounting the lens unit 120 therein.

In this instance, the first surface of the frame 300 is perpendicular to the second surface of the frame 300.

And, and, the frame 300 can have recess formed in a third surface of the frame additionally, for mounting the lens unit therein.

In this instance, the third surface of the frame 300 can be perpendicular to the first surface and parallel to the second surface opposite to each other.

Figure 18:
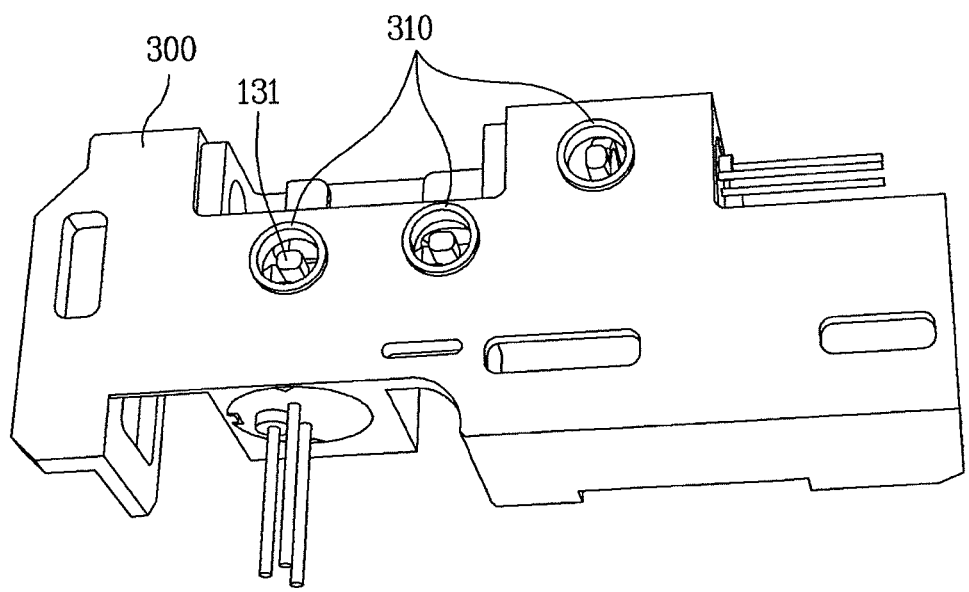
Figure 20:
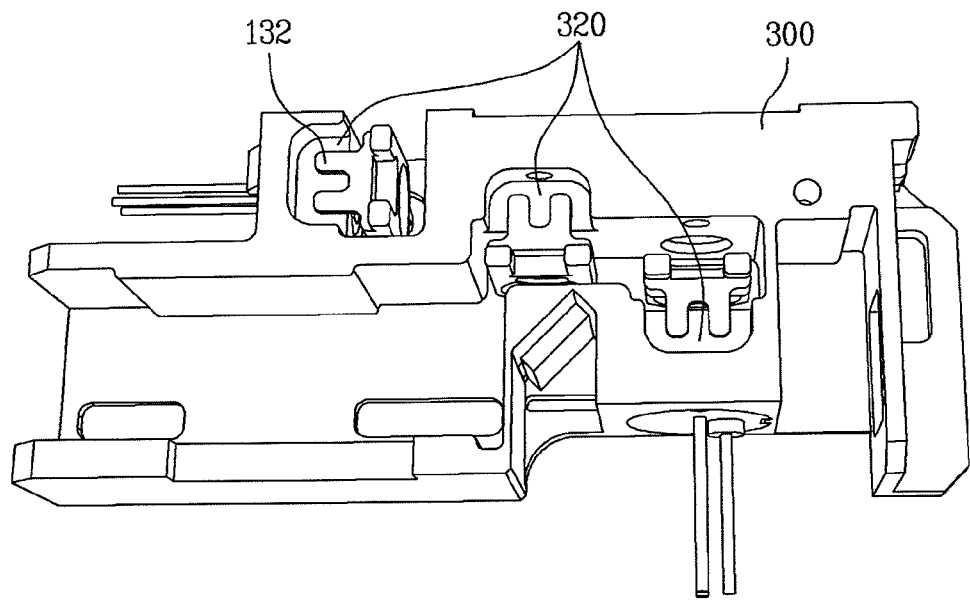

The recess in the third surface of the frame 300 can be a second seating portion 320 for seating an upper portion of the lens unit 120 therein as shown in FIG. 20, and the second hole in the second surface of the frame 300 can be a first seating portion 310 for seating a lower portion of the lens unit 120 therein as shown in FIG. 18.

Then, the light source 110 having a red light source 111, a green light source 112 and a blue light source 113 are mounted to be fixedly secured to the first hole in the frame 300, respectively.

Next, the lens unit has a lens holder 130, and a lens 120, wherein the lens 120 has first, second and third lenses 121, 122 and 123 arranged in front of corresponding first, second and third light sources 111, 112 and 113, respectively.

In this instance, the lens unit has an alignment assisting shape fixed to the frame 300 on one side of the light source for beam alignment of the light source 110.

That is, the lens unit can include a lens holder 130 having the alignment assisting shape formed thereon, and a lens 120 coupled to the lens holder 130.

Figure 14:
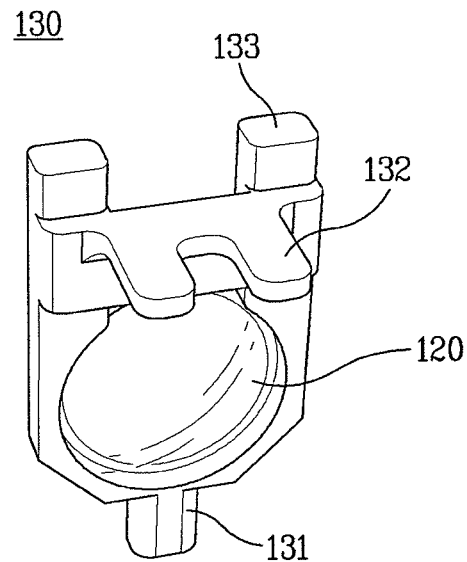
FIG. 14 illustrates a perspective view of the lens holder in FIG. 13.
Figure 15:
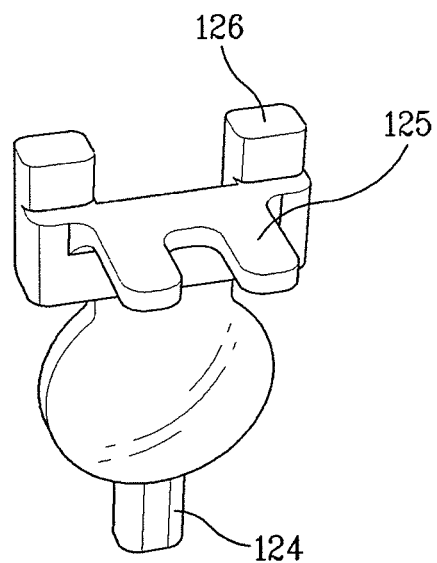
FIGS. 15 and 16 illustrate perspective views of examples of the lens shape in FIG. 13, respectively.

In this instance, referring to FIG. 14, the lens holder 130 can include first and second contact portions 131 and 132, and a holding portion 133.

In this instance, the first contact portion is a region in contact with the frame 300, the second contact portion 132 is a region in contact with the frame 300 at a position opposite to the first contact portion 131, and the holding portion 133 is a region having an external force to be applied thereto for beam alignment of the lens unit.

Figure 19:
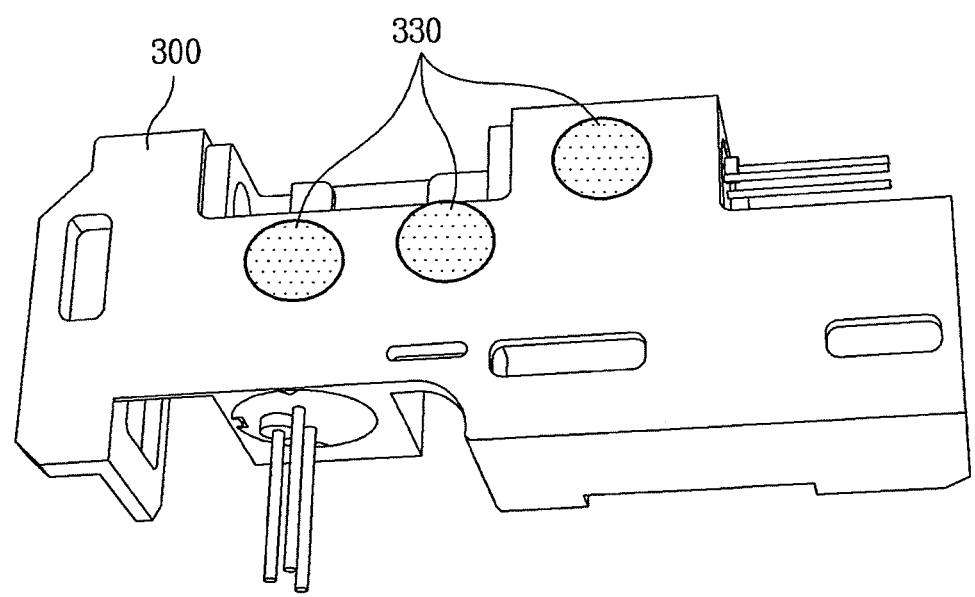
Figure 21:
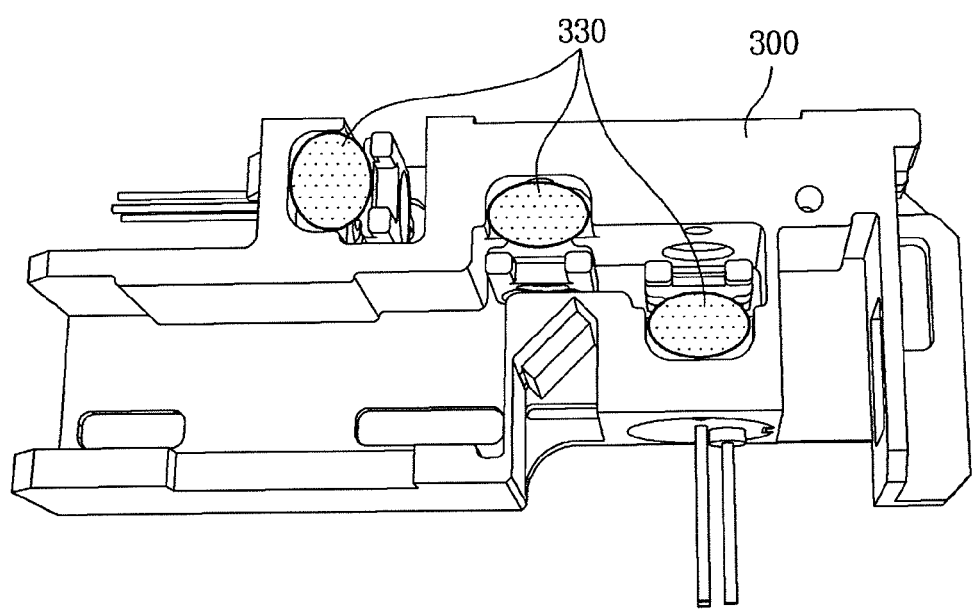

In this instance, referring to FIGS. 19 and 21, at least one of the first and second contact portions 131 and 132 can be fastened to the frame 300 with an adhesive.

And, the first contact portion 131 can be at least one projection from a bottom side of the lens holder perpendicular to a light axis of the light source 110, and the holding portion 133 can be at least one projection from a top side of the lens holder 130 perpendicular to the light axis of the light source 110.

In this instance, the holding portion 133 can have a number of the projections the same or greater than a number of projections of the first contact portion 131.

And, the second contact portion 132 can be formed projected from a side of the lens holder 130 in horizontal direction with respect to the light axis of the light source 110.

In this instance, the second contact portion 132 can be formed adjacent to the holding portion 133.

Then, the lens holder 130 can be formed as one unit with the lens 120.

In the meantime, for beam alignment of the lens unit of the present invention, the present invention can include a beam alignment device additionally for making fine movement and fastening of the lens unit.

Figure 22:
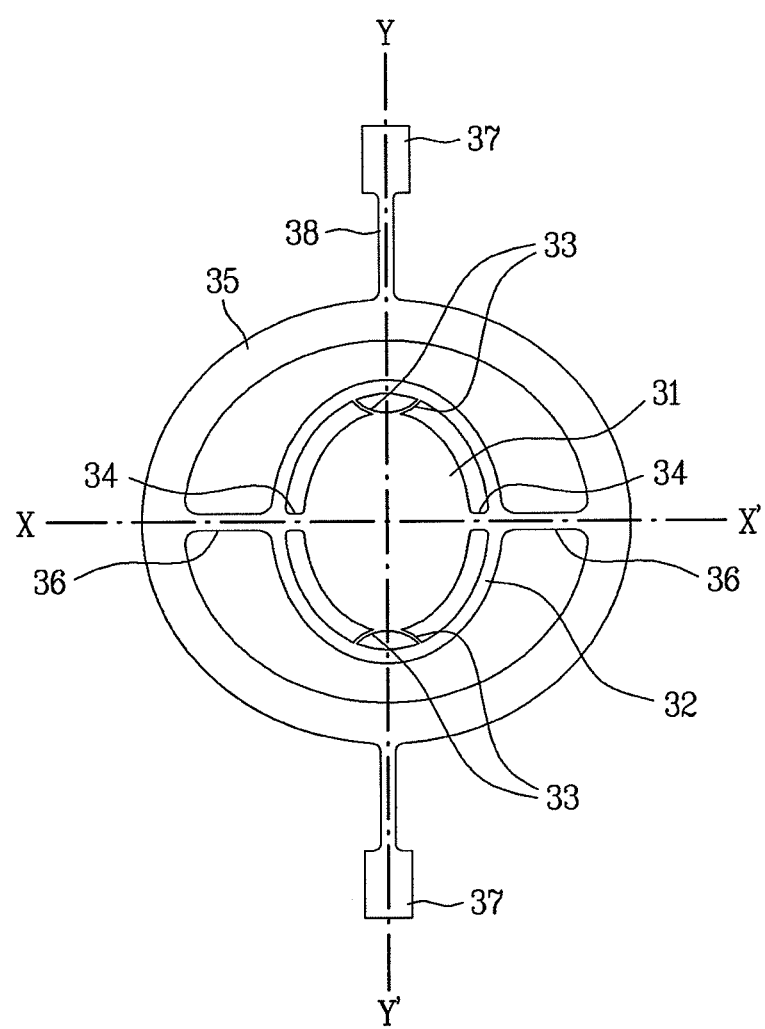
FIG. 22 illustrates a schematic view of a beam alignment device for making beam alignment of the lens unit in FIG. 13.

Referring to FIG. 22, the beam alignment device of the present invention can include a motor 51, a driving shaft 52, a plate 53, a measuring unit 54, and a supporting portion 55.

In this instance, the motor 51 serves to generate power for moving the lens unit, the driving shaft 52 is driven by the motor 51, and the plate 53 is connected to the driving shaft 52 and is in contact with the lens holder 130 of the lens unit.

And, the measuring unit 54 serves to measure coordinates of the plate 53, and the supporting portion 55 is arranged opposite to the plate 53 for supporting a horizontal direction and a vertical direction of the lens unit.

A beam alignment process of the beam alignment device will be described.

At first, upon putting the motor 51 into operation, the driving shaft 52 is driven by the motor 51, and the plate 53 connected to the driving shaft 52 moves following movement of the driving shaft 52.

Then, the lens holder 130 of the lens unit is moved by the plate 53, and the measuring unit 54 measures coordinates of the plate 53 to move the plate 53 until the lens unit is beam aligned.

In this instance, since the supporting potion 55 has an elastic body like a spring, the supporting portion 55 can secure the lens unit having the beam alignment thereof finished thus.

Thus, besides the mechanical control system, a system using screw and the like, or bonding, such as UV bonding, can be used for the beam alignment device.

In the meantime, the color mixing unit 140 can serve to mix lights from the red, green and blue light sources 111, 112 and 113, and the scanner 30 can serve to scan the screen with the light mixed by the color mixing unit 140 to compose an image.

Thus, in the scanning display of the present invention, the light source 110 is fixedly secured to the frame 300, and the lens 120, secured to the lens holder 130, is fastened to one side of respective light sources 110, aligned to light sources 110.

In this instance, if the light source 110 is fixedly secured to the frame 300, and only the lens 120 secured to the lens holder 130 is beam aligned with respect to the light source 110, since only total 18 degrees of freedom are required for beam alignment of the light source 110 and the lens 120, time and equipment required for the beam alignment can be reduced, significantly.

That is, since the present invention enables to carry out collimation which forms a parallel light and alignment at a time by the beam alignment of the lens 120, degrees of freedom of the adjustment can be minimized.

In this instance, since the degrees of freedom of the adjustment can be minimized further if the light source 110 and the lens 120 are symmetric with respect to the light axis, the degrees of freedom of the adjustment can be determined according to characteristics of the light source 110 and the lens 120.

Referring to FIG. 14, the lens holder 130 having the lens 120 coupled thereto is fastened to the frame 300 on one side of the lens, wherein the lens holder 130 can have a first contact portion 131 and a second contact portion 132 formed thereon for being brought into contact with, and bonded to, the frame 300, and a holding portion 133 for holding a lens holder 130 with a chuck of external alignment means, like a jig or a mechanism like an actuator to make the alignment.

The first contact portion 131 and the second contact portion 132 can be formed at opposite positions for making effective contact with, and fastening to, the frame 300.

In the meantime, an alignment assisting shape can be formed on the lens 120 directly for alignment and fastening of the lens to the frame 300.

That is, referring to FIG. 8, a first contact portion 124 and a second contact portion 125 can be formed for securing the lens 120 itself, and a holding portion 126 can be formed together with the lens 120 for the alignment.

Figure 16:
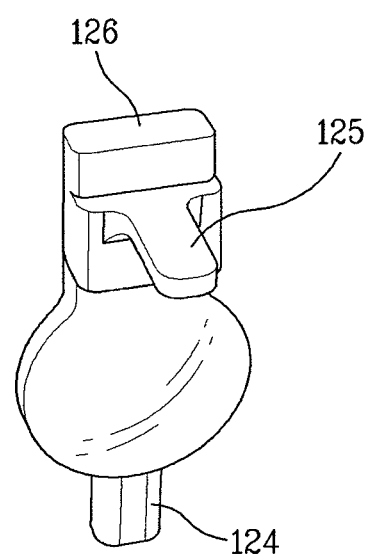

And, in a case a shape for aligning and fastening the lens 120 is formed as one unit with the lens 120, the shape can be simplified as shown in FIG. 16.

A process for aligning and fastening the lens 120 by using the lens holder 130 will be described. This description can also be applicable to the case the shape for aligning and fastening the lens 120 is formed as one unit with the lens 120 itself described above.

Figure 17:
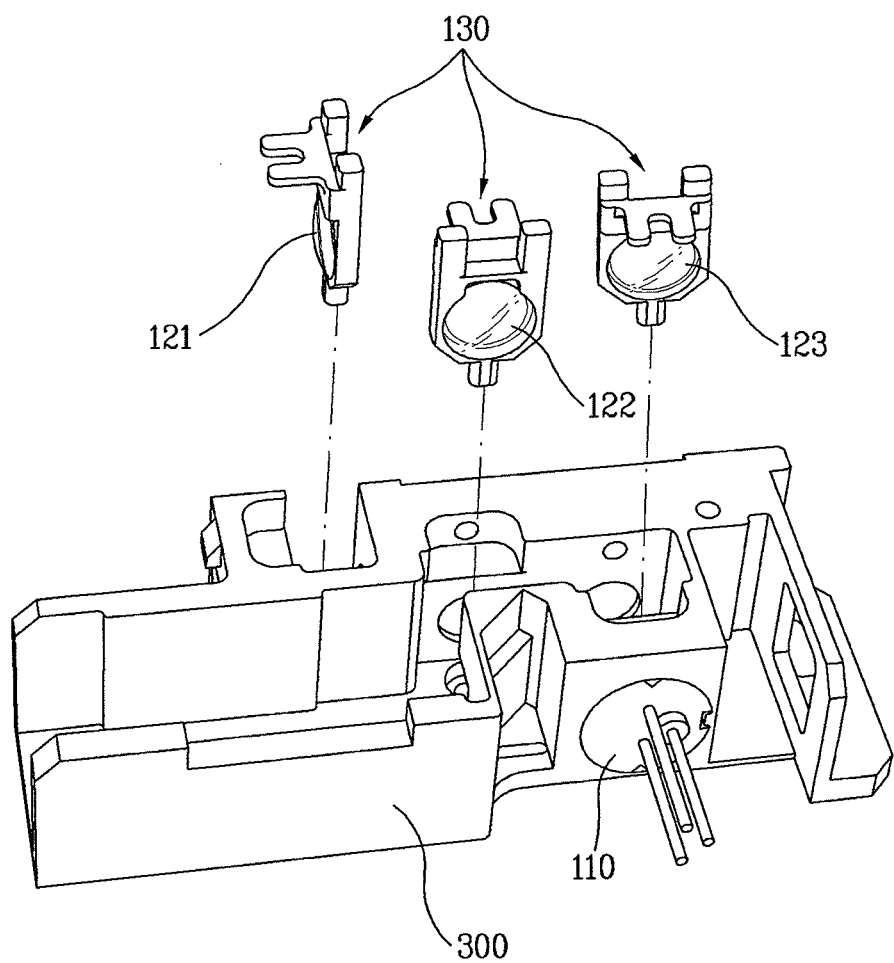
FIGS. 17 to 21 illustrate perspective views showing the steps of a process of beam alignment of a lens to a frame.

At first, referring to FIG. 17, the lenses 121, 122 and 123 are aligned to the frame 300 having the light source 110 fastened thereto in a state the lenses 121, 122 and 123 are coupled to the lens holder 130. In this instance, the beam alignment process can be made precisely in a state the holding portion 133 of the lens holder 130 is held by the chuck of the beam alignment jig.

A rear side of the frame 300 having the beam alignment made thus has a state as shown in FIG. 18. That is, the first contact portion 131 of the lens holder 130 is in a state in which the first contact portion 131 is positioned aligned with the first seating portion 310 of the frame 300.

In this instance, the first seating portion 310 can be formed circular similar to a shape of the first contact portion 131, and, since an alignment margin is required, the first seating portion 310 can be formed greater than the first contact portion 131.

Referring to FIG. 19, in a state the first contact portion 131 is placed in the first seating portion 310 thus, the adhesive 330 is coated to the first seating portion 310 for bonding the lens holder 130 for the first time.

In the meantime, a front of the frame 300 in a state the beam alignment is made is in a state as shown in FIG. 20, in which the second contact portion 132 of the lens holder 130 is positioned at the second seating portion 320 of the frame 300.

In this instance, alike the first seating portion 310, in order to secure an alignment margin, the second seating portion 320 can be formed wider or greater than the second contact portion 132.

Referring to FIG. 21, under this state, by coating the adhesive 330 to the second seating portion 320, the lens holder 130 can be bonded.

In this instance, the adhesive 330 can be a UV bond, which enables rigid bonding of the lens holder 130 as the UV bond is hardened when an UV beam is directed to the UV bond, allowing fixing a position of the lens 120.

In this instance, depending on cases, for the beam alignment, no external jig is used, but the beam alignment device, such as the screw, is mounted to the frame 300 for carrying out fine alignment. A number of the beam alignment devices can vary with the degrees of freedom of the beam alignment, and in a case the beam alignment is carried out by using the beam alignment devices, no adhesive can be required, any more.

The operation of the scanning display will be described with reference to FIG. 13.

At first, the light from the light source 110 is changed to a parallel light by the collimating lenses 121, 122, and 123; 120, and the red, green and blue lights changed to the parallel light thus are mixed together at the color mixing unit 140 into a color for producing a picture.

The light mixed thus is incident on the scanner 30 via the mirror 150, and the scanner 160 projects an image incident thereon thus to an external screen, to produce the picture.

Figure 23:
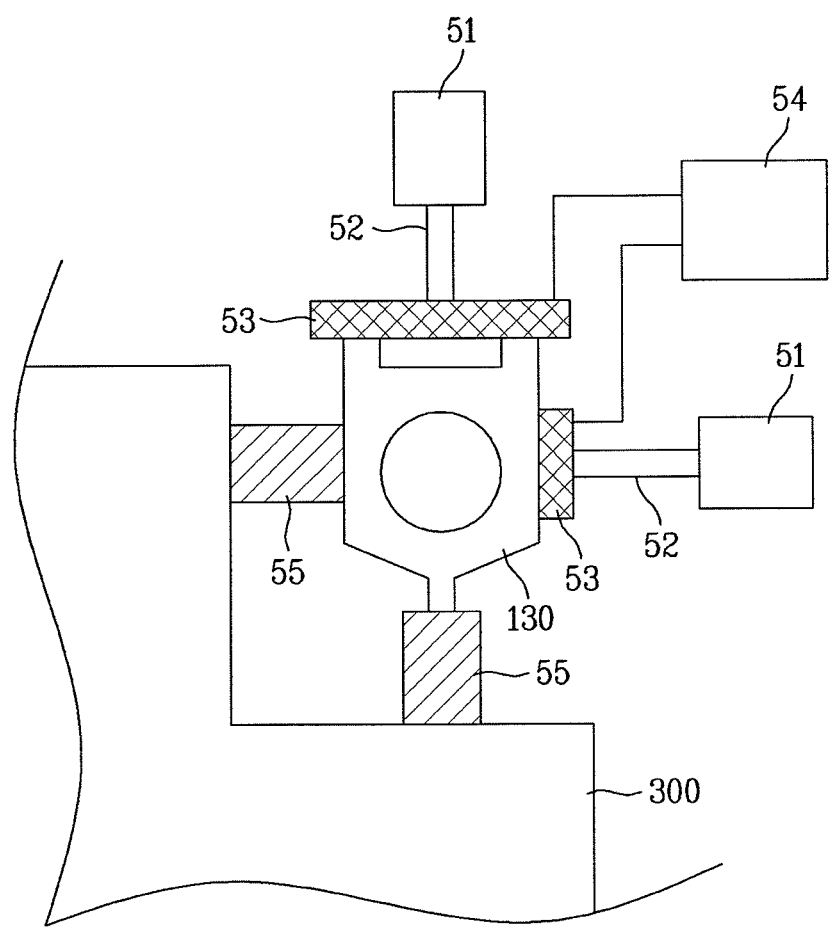
FIG. 23 illustrates a plan view showing an example of a scanner.

In the meantime, FIG. 23 illustrates a plan view showing an example of the scanner 30. That is, the scanner 30 includes a mirror plate 31 positioned on an inner side having a reflective surface for reflecting an image of the laser beam, and an outer frame 32 on an outside of the mirror plate 31 for holding the mirror plate 31.

The mirror plate 31 is connected to the outer frame with a first connection portion 33 in a rotating axis direction (a first direction; X-X' direction), and connected to the outer frame 32 with a second connection portion 33 in a direction perpendicular to the first connection portion 33.

And, positioned on an outside of the outer frame 32, there is a gimbals 35 rotatable in a direction (a second direction; Y-Y') perpendicular to the rotating axis direction (a first direction; X-X' direction) of the mirror plate 31, wherein the gimbals 35 and the outer frame 32 are connected to each other with one pair of inner elastic flexible structures 36 symmetrically positioned with respect to the mirror plate 31 in the rotating axis direction (a first direction; X-X' direction) of the mirror plate 31.

In the meantime, the gimbals 35 are connected to holding portions 37 with one pair of outer elastic flexible structures 38 positioned symmetric with respect to the gimbals 35.

Accordingly, since the mirror plate 31 is rotatable in the first direction, and the gimbals 35 having the mirror plate 31 mounted thereto is rotatable in the second direction, the mirror plate 31 is rotatable in two directions that are perpendicular to each other.

In this instance, the inner elastic flexible structures 36 and the outer elastic flexible structures 38 provide a restoring torque to act as a rotating shaft when the scanner 30 is in operation.

That is, the outer frame 32 rotates taking the inner elastic flexible structures 36 as a shaft thereof, and the gimbals 35 rotates taking the outer elastic flexible structures 38 as a shaft thereof.

Since respective shaft direction movements give no influence to each other owing to a gimbals 35 structure, enabling independent control, a scanner 30 having any angle within a two dimensional plane can be produced.

The scanner 30 permits very fast sweeping since the scanner 30 scans by fine rotation of the mirror plate 31.

As described, since the mirror plate 31 of the scanner 30 has a structure in which the scanner 30 is able to rotate in two directions that are perpendicular to each other, enabling to operate the scanner 30 for horizontal direction scanning and vertical direction scanning.

That is, the scanner 30 scans the image composed at the optical system in left/right directions. with respect to the first direction axis which is the X-X' direction and, then, in a vertical direction with respect to the second direction axis which is the Y-Y' direction, to compose a picture.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A beam alignment method of a scanning display having a light source and a lens comprising the steps of:
providing a frame having a first hole and a second hole perpendicular to the first hole;
inserting the light source into the first hole of the frame in a first direction;
fixing the light source to the first hole of the frame;
inserting the lens into the second hole of the frame in a second direction perpendicular to the first direction;
moving the lens to a front side of a light emission surface of the light source;
making fine adjustment of the lens in air to determine whether the beam alignment is finished or not; and
fastening the lens to the frame when the beam alignment is finished.

2. The method as claimed in claim 1, wherein the step of moving the lens to a front side of a light emission surface of the light source includes the steps of:
picking-up a region of an edge of the lens with a chuck of a jig; and
moving the lens held by the chuck to the front side of the light emission surface of the light source.

3. The method as claimed in claim 2, wherein the step of making fine adjustment of the lens in air to determine whether the beam alignment is finished or not includes the steps of:
making fine adjustment of the lens positioned in front of the light emission surface of the light source in air;
measuring beam alignment of the lens having fine adjustment made thus;
determining whether the beam alignment measured thus is appropriate or not; and
finishing the fine adjustment if the beam alignment measured thus is appropriate.

4. The method as claimed in claim 1, wherein the step of fastening the lens to the frame includes the steps of:
placing an adhesive in between a region of an edge of the lens having beam alignment finished thus and the frame; and
setting the adhesive to fasten the lens to the frame.

5. The method as claimed in claim 4, wherein the step of placing an adhesive in between a region of an edge of the lens and the frame further includes steps of:
one point bonding in which one region of the edge of the lens is bonded; or
two point bonding in which two regions of the edge of the lens are bonded.

6. The method as claimed in claim 1, wherein the step of fastening the lens to the frame further includes the steps of:
moving a fastening screw formed at the frame for a first time to bring the screw into contact with a region of an edge of the lens having beam alignment finished thus; and
moving the fastening screw formed at the frame for a second time to fasten the lens.

7. A scanning display comprising:
a frame having a first hole and a second hole perpendicular to the first hole;
at least one light source fixedly secured to the first hole of the frame;
a lens positioned in front of a light emission surface of the light source, the lens having a holder detachably mounted to an external adjusting device which is to make fine adjustment to finish beam alignment; and
a fastening portion for fastening the lens having beam alignment finished thus to the frame,
wherein the light source is inserted into the first hole of the frame in a first direction, and
wherein the lens is inserted into the second hole of the frame in a second direction perpendicular to the first direction.

8. The scanning display as claimed in claim 7, wherein the holder of the lens is a projection from a portion of an edge region of the lens.

9. The scanning display as claimed in claim 7, wherein the lens includes at least one contact projection projected from a portion of an edge region of the lens opposite to the frame to be in contact with the frame.

10. The scanning display as claimed in claim 9, wherein the contact projection is one or two.

11. The scanning display as claimed in claim 7, wherein the lens is formed as one unit with the holder.

12. The scanning display as claimed in claim 7, wherein the fastening portion is either an adhesive or a fastening screw.

13. The scanning display as claimed in claim 7, wherein the fastening portion fastens one region of the edge of the lens to the frame.

14. The scanning display as claimed in claim 7, wherein the fastening portion fastens two regions of the edge of the lens to the frame.

15. The scanning display as claimed in claim 14, wherein the two regions of the edge of the lens fastened to the frame are symmetry to each other.

16. The scanning display as claimed in claim 7, further comprising:
   a color mixing unit fixedly secured to the frame for mixing the light from the light source; and
   a scanner fixedly secured to the frame for scanning a screen with the light mixed at the color mixer.

17. A scanning display comprising:
   a frame having a light source, a color mixing unit and a scanner fixedly secured thereto;
   a lens positioned in front of a light emission surface of the light source for changing the light from the light source to a parallel light;
   a holder projected from one side of the lens for being subjected to fine adjustment by an external force for beam alignment of the lens; and
   an adhesive formed symmetry with each other at opposite sides of the lens opposite to the frame for bonding the lens to the frame,
   wherein the frame has a first hole and a second hole perpendicular to the first hole,
   wherein the light source is inserted into the first hole of the frame in a first direction, and
   wherein the lens is inserted into the second hole of the frame in a second direction perpendicular to the first direction.

* * * * *